(12) United States Patent
Johnson et al.

(10) Patent No.: US 9,492,786 B2
(45) Date of Patent: Nov. 15, 2016

(54) MULTI-PURPOSE ABSORBER

(75) Inventors: Dennis W. Johnson, Simpsonville, SC (US); James H. Brown, Simpsonville, SC (US)

(73) Assignee: Fluor Corporation, Sugar Land, TX (US)

( * ) Notice: Subject to any disclaimer, the term of this patent is extended or adjusted under 35 U.S.C. 154(b) by 798 days.

(21) Appl. No.: 13/302,297

(22) Filed: Nov. 22, 2011

(65) Prior Publication Data
US 2013/0129588 A1    May 23, 2013

(51) Int. Cl.
*B01D 53/50* (2006.01)
*B01D 53/75* (2006.01)
*B01D 53/62* (2006.01)
*B01D 53/78* (2006.01)

(52) U.S. Cl.
CPC ............ *B01D 53/50* (2013.01); *B01D 53/62* (2013.01); *B01D 53/75* (2013.01); *B01D 53/78* (2013.01); *Y02C 10/04* (2013.01); *Y02C 10/06* (2013.01); *Y02C 10/08* (2013.01)

(58) Field of Classification Search
CPC ...... B01D 53/50; B01D 53/62; B01D 53/75; B01D 53/78; Y02C 10/04; Y02C 10/06; Y02C 10/08
USPC .......................................................... 96/234
See application file for complete search history.

(56) References Cited

U.S. PATENT DOCUMENTS

| | | | |
|---|---|---|---|
| 4,568,364 A * | 2/1986 | Galstaun et al. | 95/176 |
| 6,342,091 B1 * | 1/2002 | Menzel et al. | 95/167 |
| 6,399,030 B1 | 6/2002 | Nolan | |
| 6,645,446 B1 * | 11/2003 | Won et al. | 423/210 |
| 7,867,322 B2 | 1/2011 | Gal | |
| 8,535,427 B2 * | 9/2013 | Iijima et al. | 96/234 |
| 2003/0045756 A1 * | 3/2003 | Mimura et al. | 564/498 |
| 2004/0253159 A1 * | 12/2004 | Hakka et al. | 423/228 |
| 2006/0110300 A1 * | 5/2006 | Mak | 422/190 |
| 2009/0148371 A1 | 6/2009 | Reddy et al. | |
| 2010/0061904 A1 * | 3/2010 | Lund et al. | 423/229 |

(Continued)

FOREIGN PATENT DOCUMENTS

| | | |
|---|---|---|
| JP | 2009-226367 A | 10/2009 |
| JP | 2011-177674 A | 9/2011 |

(Continued)

OTHER PUBLICATIONS

Patent Cooperation Treaty, "Notification of Transmittal of the International Search Report and the Written Opinion of the International Searching Authority, or the Declaration", PCT Application No. PCT/US12/66002, issued Mar. 26, 2013.

*Primary Examiner* — Amber R Orlando
*Assistant Examiner* — Britanny Precht
(74) *Attorney, Agent, or Firm* — Conley Rose, P.C.; Kristin Jordan Harkins (57) ABSTRACT

Systems and methods directed to cleaning a flue gas are described, in which a column housing can be configured to receive a feed stream, and includes an absorber configured to produce a clean stream that is substantially depleted of at least one of $SO_x$ and $CO_2$. The absorber can comprise at least one of (1) a primary $CO_2$ capture system disposed downstream of a gas conditioning system and (2) a primary acid gas removal system disposed upstream of a gas conditioning system. The gas conditioning system can also be disposed in the column housing.

14 Claims, 10 Drawing Sheets

(56) References Cited

U.S. PATENT DOCUMENTS

| | | |
|---|---|---|
| 2010/0064889 A1 | 3/2010 | Gal |
| 2010/0307344 A1* | 12/2010 | Iijima et al. ............. 96/234 |
| 2011/0135550 A1* | 6/2011 | Nagayasu et al. ........ 423/230 |
| 2013/0008310 A1* | 1/2013 | Aroonwilas et al. ....... 95/232 |
| 2013/0098248 A1* | 4/2013 | Yoshizumi et al. ........ 96/234 |

FOREIGN PATENT DOCUMENTS

| | | |
|---|---|---|
| WO | 2007/075485 | 7/2007 |
| WO | 2010/102877 | 9/2010 |

* cited by examiner

MULTI-PURPOSE ABSORBER

FIELD OF THE INVENTION

The field of the invention is flue gas cleaning systems and methods.

BACKGROUND

In the current debate on climate change, carbon dioxide ($CO_2$) release and capture from fossil fuels is an important topic. Release and capture systems are often very large and expensive, and require a significant amount of energy. For example, before $CO_2$ can be captured from fossil fuel plants, the flue gas from the plant must typically first be conditioned with a direct contact cooler (DCC).

Figure 1:
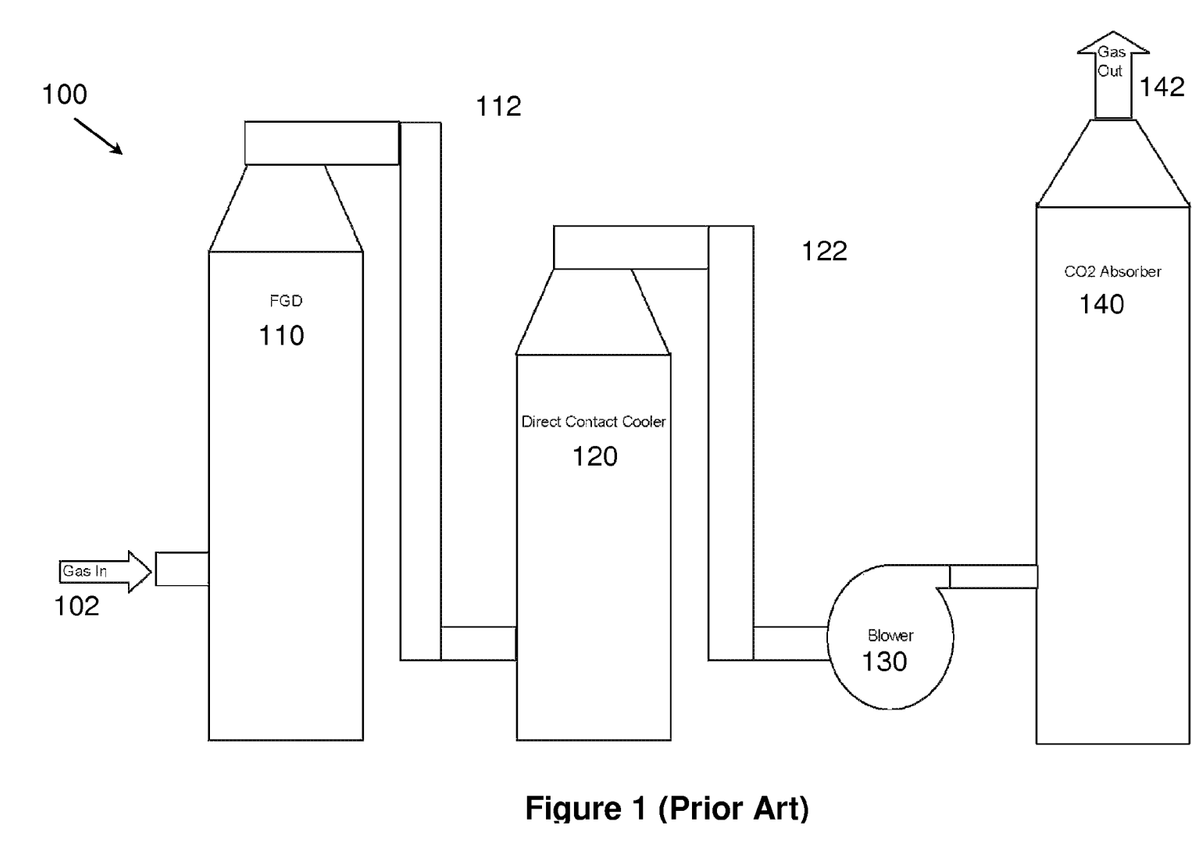
FIG. 1 is a schematic of a prior art flue gas cleaning system.

In prior art applications such as that shown in FIG. 1 and the amine-based technology for large-scale, post-combustion CO2 capture (ECONAMINE FG PLUS™) plant that was built in Bellingham, Mass., which captured $CO_2$ from combined cycle natural gas turbines, the gas enters a DCC then a $CO_2$ absorber. For applications that contain species such as sulfur and chlorine compounds (e.g., coal, oil, coal derived fuels, bitumen, coke, sour gas, and other fossil fuels), the gas will typically first enter a flue gas desulfurization unit (FGD) before it enters the side of the DCC tower, turns 90 degrees, passes through irrigated packing, and exits through the top of the DCC tower, and finally enters a $CO_2$ absorber. Thus, three separate vessels are used. Moreover, when a DCC is used downstream of another gas cleaning system such as the FGD system shown in FIG. 1, the ductwork arrangement is typically complicated because the gas exits the top of the FGD and is directed to the bottom of the adjacent DCC, where it flows to the top of the DCC and back down to ground level into a blower or booster fan.

Various other $CO_2$ release and capture systems are also known including, for example, those having multi-stage FGDs (e.g., U.S. Pat. No. 7,514,053 to Johnson et al.), multistage DCCs (e.g., U.S. pat. appl. no. 2009/0148371 to Reddy et al.), and wet electrostatic precipitators (WESPs) coupled downstream of a FGD. In addition, U.S. Pat. No. 6,399,030 to Nolan discusses a combined removal system that separates $CO_2$ and sulfur oxide gases from furnace flue gases in a single vessel with two chambers, and U.S. Pat. No. 7,867,322 to Gal discusses a gas cleaning system with a combined cooling/cleaning system downstream of a primary FGD, which functions to cool the gas and remove residual sulfur dioxide from the FGD product gas. However, none of the systems known to Applicant include a conditioning process with a primary absorber in a single tower, such that the gas can be conditioned prior to a $CO_2$ absorption process.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for systems and methods that include a primary absorber and gas conditioning system housed in a single vessel, such that a flue gas can be conditioned prior to a $CO_2$ absorption process.

SUMMARY OF THE INVENTION

The inventive subject matter provides apparatus, systems and methods, in which a flue gas can be cleaned and conditioned in a single tower. It is contemplated that the inventive subject matter could be used with a broad spectrum of processes that utilize a $CO_2$ capture process, as well as gas conditioning for a process other than $CO_2$ capture. Exemplary applications include, for example, power production, pulp and paper, mining, refining, steel, concrete manufacturing, chemicals, incineration and other industries having $CO_2$-containing gases that may require or may have post-combustion $CO_2$ capture processes, and particularly those industries requiring flue gas cooling or conditioning such as to reduce the water content of the gas. By utilizing the inventive subject matter discussed herein, these industries can achieve significant savings when compared with existing processes.

In one aspect, contemplated flue gas cleaning systems can include a column housing configured to receive a feed stream, wherein the column housing includes (a) an absorber configured to produce a clean stream substantially depleted of at least one of $SO_x$ and $CO_2$, and (b) a gas conditioning system fluidly coupled to the absorber. The absorber preferably comprises at least one of a (1) a primary carbon dioxide capture system disposed downstream of the direct contact cooler and (2) a primary acid gas removal system disposed upstream of the gas conditioning system.

As used herein, the term "primary carbon dioxide capture system" means a main post-combustion device in a gas cleaning system configured to remove substantially all of the $CO_2$ from a flue gas, and the term "primary acid gas removal system" means a main post-combustion device in a gas cleaning system configured to remove substantially all of an acid gas from the flue gas. For example, in systems such as that described in U.S. Pat. No. 7,867,322 to Gal having a FGD upstream of a combined cooling/cleaning system configured to remove residual sulfur oxide from the FGD's product gas, the FGD would be the primary acid gas removal system and the combined cooling/cleaning system would be the secondary acid gas removal system under this definition.

In another aspect, methods for conditioning a post-combustion flue gas are contemplated. In one embodiment, a feed stream can be received in a vessel that houses an absorber and a gas conditioning system fluidly coupled to the absorber. A clean stream can be produced that is substantially depleted of at least one of $SO_x$ and $CO_2$. Preferably, the absorber can comprise at least one of (1) a primary carbon dioxide capture system disposed downstream of the gas conditioning system and (2) a primary acid gas removal system disposed upstream of the gas conditioning system.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including the reduction of the cost of post-combustion $CO_2$ capture systems by eliminating costly ductwork, eliminating the foundation and structure typically associated with a DCC by utilizing a single vessel, reducing the space required, and/or reducing the overall pressure drops of the systems.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In FIG. 1, a prior art configuration of a flue gas cleaning system 100 is shown having a flue gas desulfurization (FGD) unit 110, which is configured to receive a flue gas 102 and produce a product gas that is fed to a bottom portion of a DCC tower 120 via ductwork 112. The gas stream can pass through irrigated packing (not shown), exit the top of the DCC tower 120, and be passed through a blower 130 via ductwork 122 and fed into a bottom portion of $CO_2$ absorber 140 where a clean stream 142 can be produced. Thus, three separate vessels (FGD 110, DCC 120, and $CO_2$ absorber 140) are utilized to clean the flue gas, which increases the size and complexity of the system 100. In addition, such a configuration requires a complicated arrangement of ductwork because the gas exits the top of the FGD 110, is directed to the bottom of the adjacent DCC 120 via ductwork 112, and then flows to the top of the DCC 120 and back down to ground level into blower 130 via ductwork 122.

Figure 2:
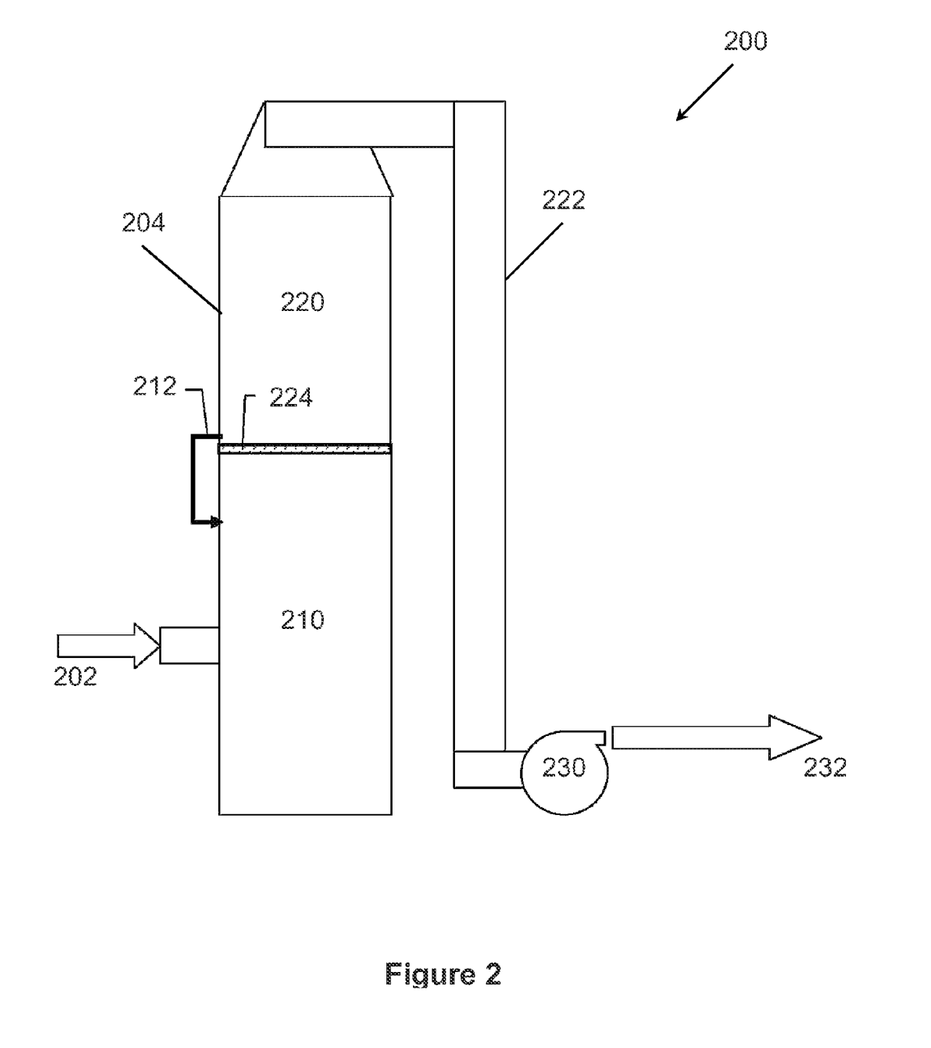
FIGS. 2-14 are schematics of various embodiments of flue gas cleaning systems having a combined absorber and gas conditioning system.

FIG. 2 illustrates one embodiment of a flue gas cleaning system 200 that includes a column housing 204 configured to receive a feed stream 202. The column housing 204 is preferably configured to house an absorber 210 configured to produce a clean stream that is substantially depleted of $SO_x$, and a gas conditioning system 220 fluidly coupled downstream of the absorber 210. By combining the absorber 210 and gas conditioning system 220 within a single housing 204, at least some of the costly ductwork required by prior art systems can be eliminated. Although the final tower will likely be taller than systems where the absorber and gas conditioning system have separate housings, the cost savings of system 200 through the elimination of costly ductwork, foundation, and structure typically associated with the gas conditioning system 220, the reduced space required, and the reduction of the pressure drop of system 200 would be greater than any additional costs required due to the height of system 200.

The system 200 could be applied to various processes including, for example, the amine-based technology for large-scale, post-combustion CO2 capture (ECONAMINE FG PLUS™) process that has a direct contact cooler (DCC) for flue gas conditioning after a scrubbing system such as a FGD unit. In addition, system 200 could be applied to coal or oil-fired power plants and any other process that utilizes a gas conditioning system such as a DCC after an acid gas removal system. Thus, system 200 could be applied to almost all post-combustion $CO_2$ processes that are commercially available or not yet developed.

In preferred embodiments, the absorber 210 comprises a primary acid gas removal system, and more preferably, a FGD unit. However, any commercially suitable acid gas removal systems could be used including, for example, secondary acid gas removal systems, caustic scrubbers configured to remove $H_2S$ or other acid gases, chloride scrubbers, or other scrubbing systems. In this manner, system 200 could be used in a wide range of processes having a scrubbing system upstream of a $CO_2$ capture process or gas conditioning for a process other than $CO_2$ capture, and especially those that require flue gas cooling or conditioning for a purpose such as to reduce the water content. Exemplary industries include, for example, power production, pulp and paper, mining, refining, chemical manufacturing, incineration, and steel.

The gas conditioning system 220 preferably includes a DCC, although any commercially suitable gas conditioning systems could be used that are configured to quench, humidify, cool, and/or remove moisture or other condensable gases from the column housing 204 to produce a conditioned stream. In further contemplated embodiments, the gas conditioning system 220 could include two or more DCCs or other conditioning systems, or be fluidly coupled to a DCC that is disposed externally to housing 204. The gas conditioning system 220 could utilize countercurrent or concurrent flow with respect to the gas to be conditioned.

It is contemplated that absorber 210 and gas conditioning system 220 could each comprise a single-stage or multi-stage configuration.

A separation tray 224 can be disposed between the absorber 210 and the gas conditioning system 220 to segregate the fluid in the gas conditioning system 220 from the lower absorber 210. It is contemplated that the separation tray 224 could replace one or more rows of mist eliminators (not shown) in the gas conditioning system 220. It is further contemplated that the separation tray 224 and remaining mist eliminators of the absorber 210 could be rinsed with water that is condensed and separated from a gas stream in the gas conditioning system 220. Such water could also be utilized to control the density and fluid level of the absorber 210 by using a downcomer 212, overflow, or other conduit through which at least a portion of the recirculating water of the gas conditioning system 220 can flow. By utilizing the condensed water from gas conditioning system 220, pumps and conduits that otherwise might be required to provide make-up water to the absorber 210 can be eliminated, which can further reduce the cost of system 200.

From the gas conditioning system 220, at least a portion of the conditioned stream 232 can be fed through blower 230 via ductwork 222 to a $CO_2$ capture system or other process (not shown).

In some contemplated embodiments, the absorber 210 could be converted to include gas conditioning system 220. For example, it is contemplated that such combined system could be used in absorbers using soluble reagents such as ammonia, sodium, potassium, and magnesium. Calcium-based systems (e.g., lime or limestone) could also be used by cooling the slurry that is saturated with calcium to provide heat transfer needed for direct contact cooling. To avoid potential problems with suspended solids in the heat transfer equipment, the combined apparatus could be configured to accommodate the suspended solids, and the water balance could be controlled to maintain performance of the combined apparatus. In further contemplated embodiments, the absorber 210 could include a combined absorber/gas conditioning system 220, as well as a separated direct contact cooling stage that completes the gas conditioning process required for downstream $CO_2$ absorption.

Figure 3:
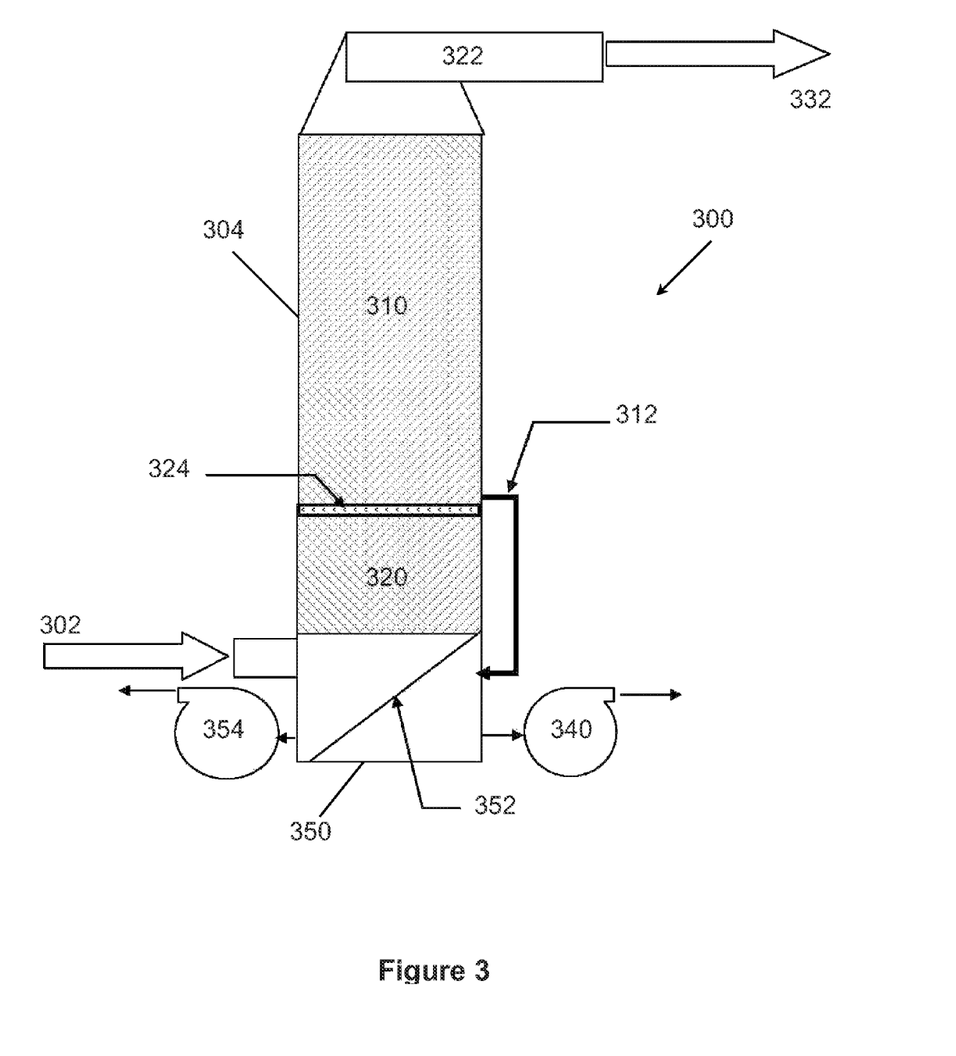

In FIG. 3, another embodiment of a flue gas cleaning system 300 is depicted having a column housing 304 configured to receive feed stream 302. The column housing 304 can house gas conditioning system 320 and an absorber 310 fluidly coupled downstream of the gas conditioning system 320 and configured to produce a clean stream 332 substantially depleted of $CO_2$. It is contemplated that the feed stream 302 could be substantially depleted of $SO_x$ such as through the use of an upstream FGD or other acid gas removal system.

In preferred embodiments, the absorber 310 comprises a primary $CO_2$ capture system disposed downstream of a DCC, which could include gas conditioning system 320 or a separate component. Thus, in this manner, a DCC and a primary $CO_2$ capture system can be combined in a single vessel 304, which offers numerous advantages over prior art systems. First, as discussed above, the configuration provides for significant cost savings by eliminating at least some of the costly ductwork that couples the gas conditioning system and absorber in prior art systems. The configuration can also reduce or eliminate foundation and structure typically associated with a gas conditioning system, and thereby also reduce the space required by the system 300. In addition, the suction head requirement for the rich solvent pumps 340 can be met by placing the absorber 310 above the gas conditioning system 320, which can eliminate the need for additional pumps or other equipment.

In system 300, the feed stream 302 can enter the housing 304 via an inlet conduit and into gas conditioning system 320 where the feed stream, or a portion thereof, can be condensed to produce a conditioned stream that can flow into absorber 310 where the conditioned stream can be substantially depleted of $CO_2$ to produce clean stream 332, which exits the absorber 310 via ductwork 322. One or more separation trays 324 could be used to separate the gas conditioning system 320 and absorber 310 and thereby segregate the fluid of the absorber 310 from the gas conditioning system 320. A downcomer pipe 312 or other commercially suitable apparatus including, for example, an overflow pipe, can be used to remove rich solvent from the absorber 310 to a tank 350 where the rich solvent can be pumped out of housing 304 via pump 340.

The tank 350 could be split into two or more sections using a baffle 352 or other means to separate the rich solvent from the feed stream 302. Pump 354 could be used to purge excess fluid from the gas conditioning system 320.

Figure 4:
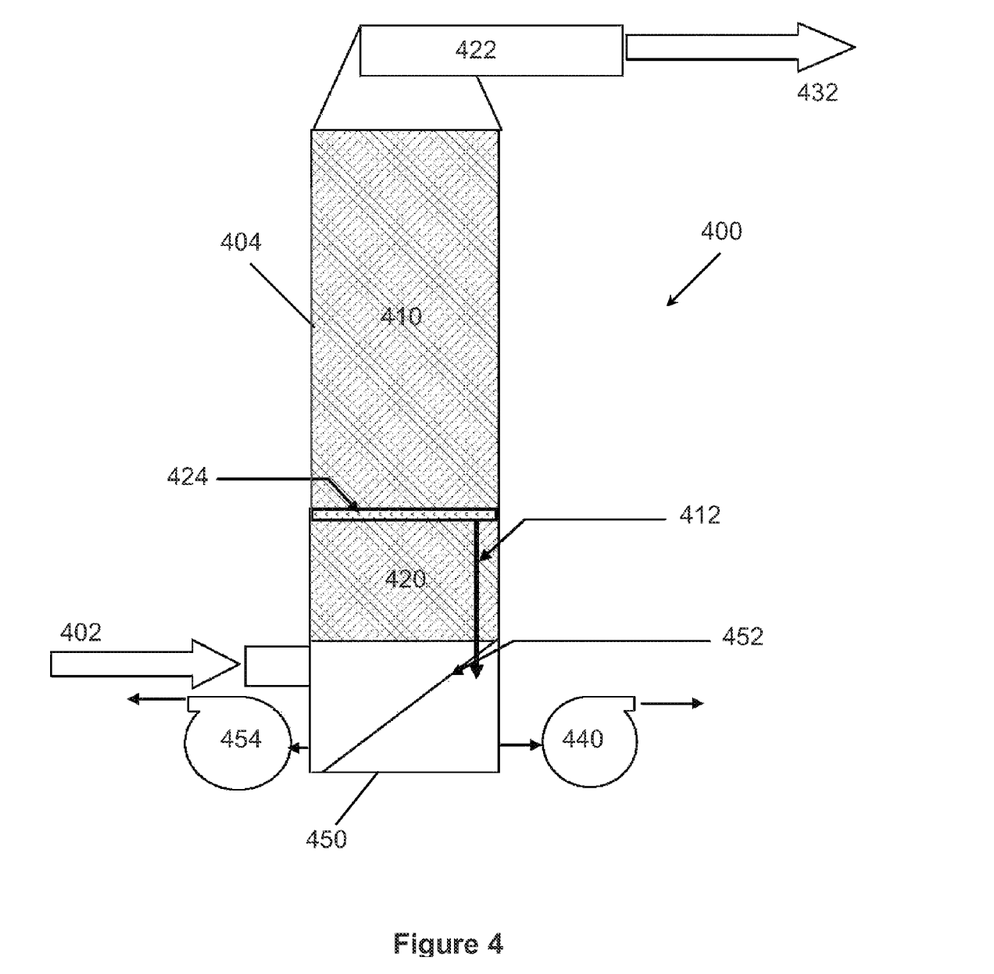

FIG. 4 illustrates yet another embodiment of a flue gas cleaning system 400 having a column housing 404 that includes a gas conditioning system 420 and an absorber 410 fluidly coupled downstream of the gas conditioning system 420. Rather than the external downcomer pipe of FIG. 3, the housing 404 can include an internal downcomer conduit 412 that removes rich solvent from the separation tray 424 and feeds the solvent to tank 450. With respect to the remaining numerals in FIG. 4, the same considerations for like components with like numerals of FIG. 3 apply.

Figure 5:
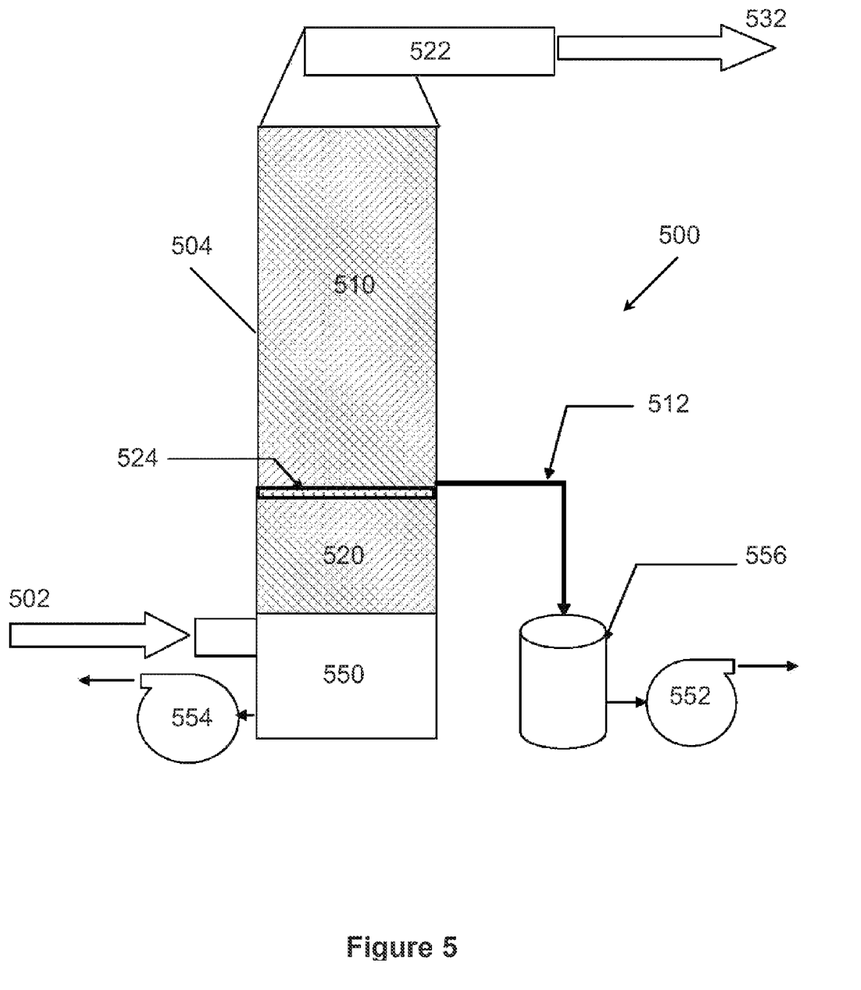

In FIG. 5, still another embodiment of a flue gas cleaning system 500 is shown having a column housing 504 that includes an absorber 510, a gas conditioning system 520, and a tank 550 configured to store fluid from the gas conditioning system 520. A separation tray 524 can be disposed between the absorber 510 and the gas conditioning system 520 such that fluid from the absorber 510 is separated from the gas conditioning system 520. Rich solvent collected on the separation tray 524 can be removed via an external downcomer conduit 512, although internal conduits are also contemplated. The rich solvent can be stored in rich solvent storage tank 556, and removed, as needed, via pump 552. With respect to the remaining numerals in FIG. 5, the same considerations for like components with like numerals of FIG. 3 apply.

Figure 6:
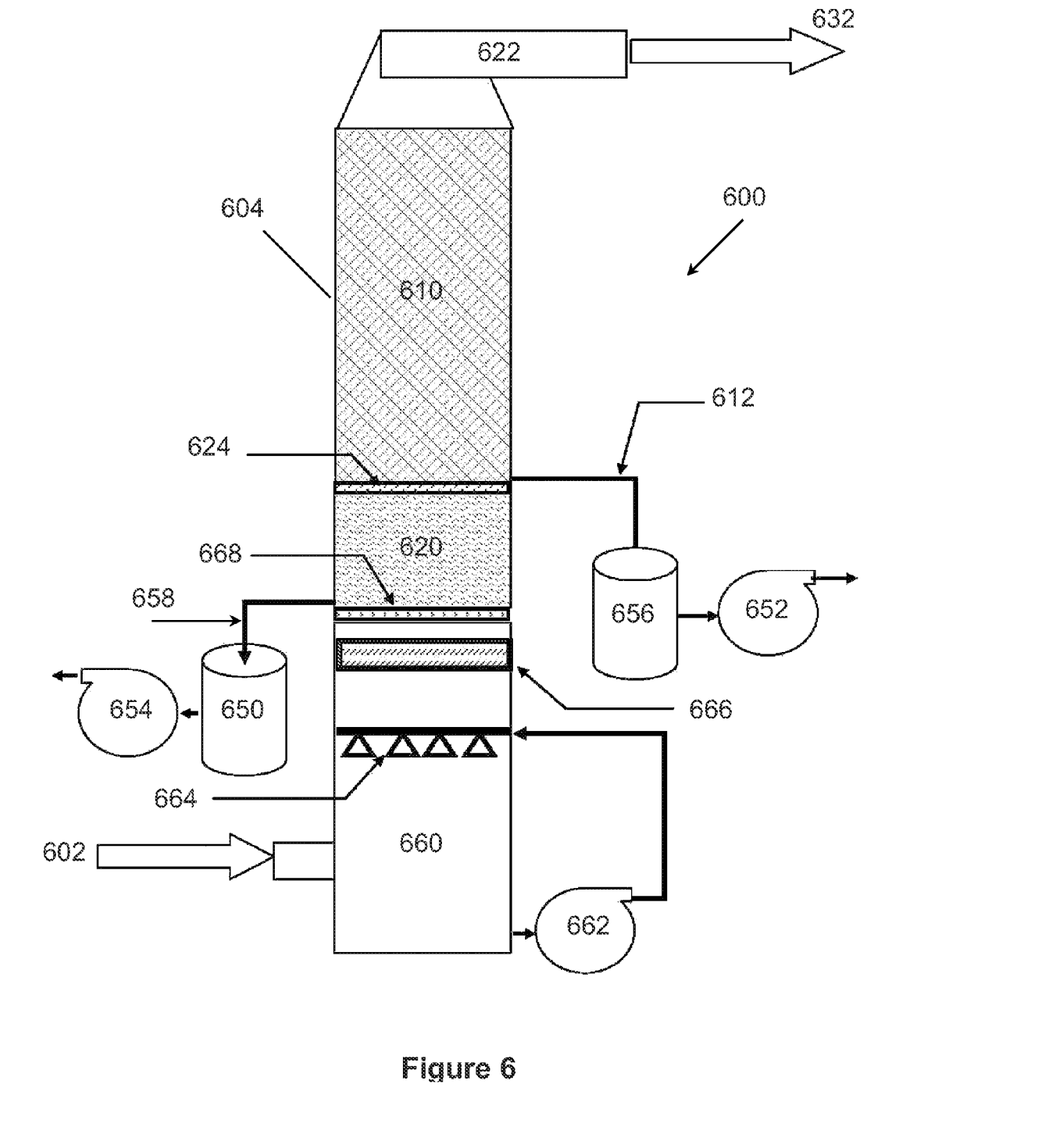

In FIG. 6, another embodiment of a flue gas cleaning system 600 is shown having a column housing 604 that houses an absorber 610, a gas conditioning system 620, and an acid gas removal system 660 in a single vessel. Although such a system 600 would increase the height of the housing 604, the system 600 could advantageously eliminate a separate chimney or stack, while also eliminating costly ductwork, structure and foundation and decrease the overall footprint of the system 600.

In preferred embodiments, the acid gas removal system 660 comprises a primary FGD unit configured to remove $SO_x$ from the feed stream 602 to produce a clean stream that is substantially depleted of $SO_x$. The acid gas removal system 660 can include one or more sets of sprays 664 which can be used to contact at least a portion of the feed stream 602 with a soluble reagent including, for example, ammonia, sodium, potassium, magnesium, and calcium. It is contemplated that the reagent can be circulated within the acid gas removal system 660 using pump 662.

Prior to exiting the acid gas removal system 660, the clean stream can pass through mist eliminators 666, such that excess liquid can be removed from the clean stream. The clean stream can then flow to the gas conditioning system 620, where the gas can be conditioned prior to flowing to the absorber 610. In preferred embodiments, the gas conditioning system 620 comprises a direct contact cooler having one or more stages. It is contemplated that the gas conditioning system 620 can be separated from the acid gas removal system 660 using separation tray 668. The separation tray 668 can be used to collect excess fluid from the gas conditioning system 620, which can subsequently be purged from system 620 using conduit 658. The excess fluid can then be stored in tank 650 for later reuse, or purged from the tank 650 via pump 654.

The absorber 610 can received the conditioned stream from the gas conditioning system 620, and produce a second clean stream 632 that is substantially depleted of $SO_x$ and $CO_2$. With respect to the remaining numerals in FIG. 6, the same considerations for like components with like numerals of FIG. 3 apply.

It is contemplated that each of the systems 300, 400, 500, and 600 could include a blower or fan (not shown) to direct the gas to or from the respective systems 300, 400, 500, and 600.

Figure 7:
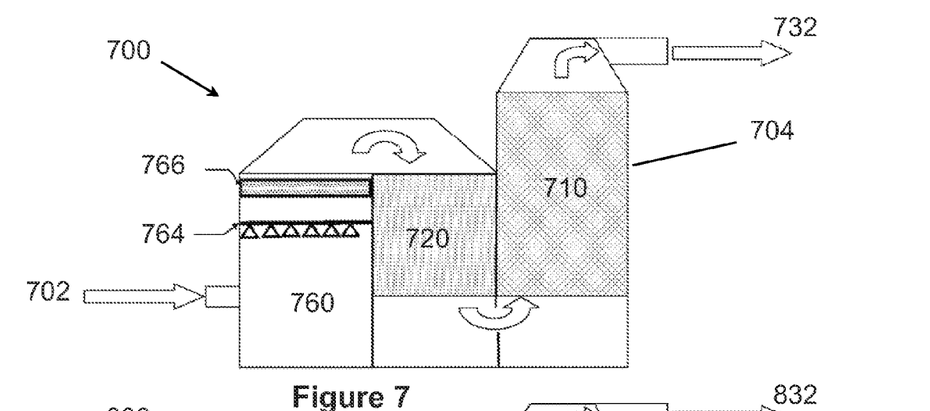

In FIG. 7, an alternative embodiment of a flue gas cleaning system 700 is shown having a housing 704 that encloses an absorber 710, gas conditioning system 720, and acid gas removal system 760 in a single vessel. Rather that utilize a vertical column such as that shown in FIG. 6, the absorber 710, gas conditioning system 720, and acid gas removal system 760 are fluidly coupled and disposed in an adjacent configuration.

A feed stream 702 can be fed into the acid gas removal system 760 where acid gases can be removed from the feed stream 702 using sprays 764 to produce a clean stream. It is contemplated that the acid gas removal system 760 can include a mist eliminator 766 to remove excess liquid from the clean stream.

The clean stream can then flow to gas conditioning system 720 where the clean stream can be conditioned. In preferred embodiments, the gas conditioning system 720 comprises a downflow direct contact cooler, where the clean stream flows downwardly (e.g., toward the bottom of gas conditioning system 720), such that a conditioned stream can be produced that exits a bottom portion of the gas conditioning system 720. The gas conditioning system 720 can include a cooling stream configured to flow concurrently with the clean stream. Exemplary embodiments of downflow gas conditioning systems are described in U.S. utility application titled "Down-Flow Direct Contact Cooler" having Ser. No. 13/302,248 filed on Nov. 22, 2011.

From the gas conditioning system 720, the now conditioned stream can flow to absorber 710, which preferably comprises a primary $CO_2$ removal system. In this manner, at least a portion of the feed stream 702 can exit system 700 as a second clean stream 732 that is substantially deplete of $SO_x$ and $CO_2$.

Figures 8, 9:
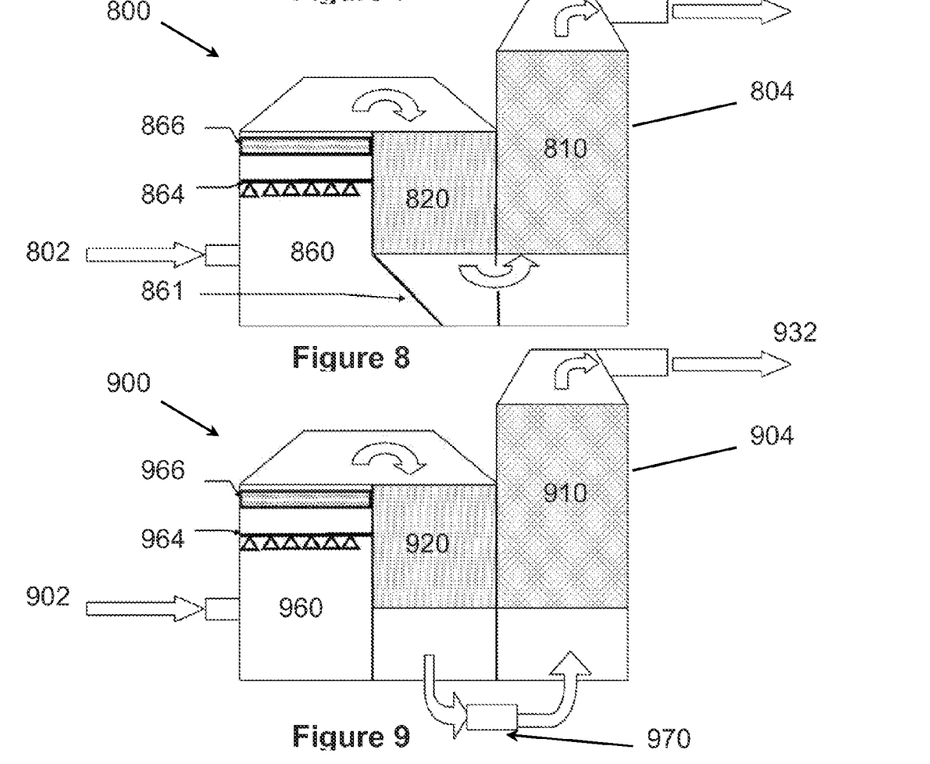

In FIG. 8, another embodiment of a flue gas cleaning system 800 is illustrated, which includes a housing 804 that encloses an absorber 810, a gas conditioning system 820, and an acid gas removal system 860 having a flared sidewall 861 in a single vessel. The acid gas removal system 860 can include a flared sidewall 861. With respect to the remaining numerals in FIG. 8, the same considerations for like components with like numerals of FIG. 7 apply.

FIG. 9 illustrates yet another embodiment of a flue gas cleaning system 900, which includes a booster fan 970 configured to move the conditioned gas from the gas conditioning system 920 into absorber 910. With respect to the remaining numerals in FIG. 9, the same considerations for like components with like numerals of FIG. 7 apply.

FIGS. 10 through 13 are top views of the various embodiments shown on FIGS. 7, 8 and 9 showing various configurations of flue gas cleaning systems each of which is disposed within a single housing. It is contemplated that the implementation of a specific embodiment will be at least partially based upon the configuration of individual components including, for example, an acid gas removal section, a gas conditioning section, and a $CO_2$ absorber. The implementation will also likely consider the use and position of a fan or blower, limitations on internals such as packing and liquid distributors, and limitations on support spans within the housing.

Figures 10, 11:
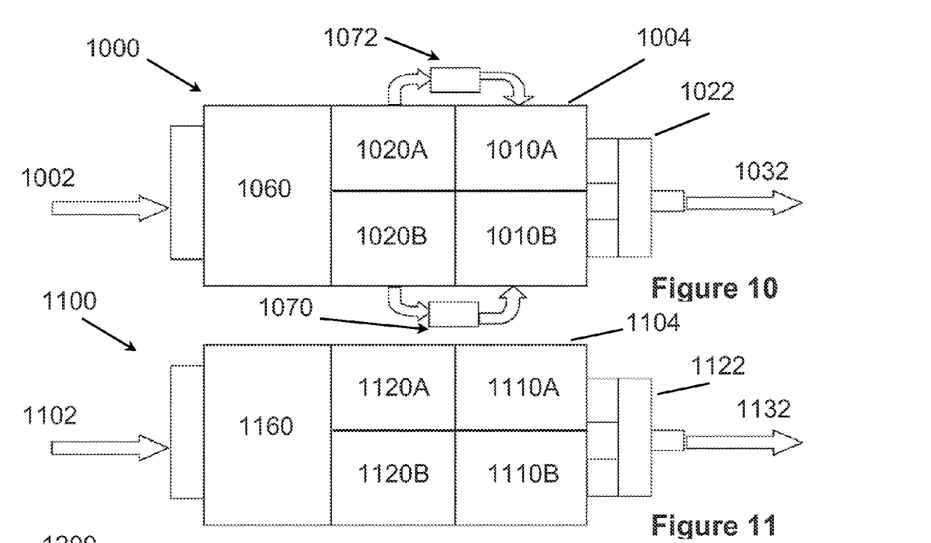

In FIG. 10, yet an alternative embodiment of a split-flow flue gas cleaning system 1000 is shown having a housing 1004 that includes a combined acid gas and a $CO_2$ capture system in a single vessel. The housing can include first and second absorbers 1010A and 1010B, first and second gas conditioning systems 1020A and 1020B, and an acid gas removal system 1060. First and second booster fans 1070 and 1072 can be coupled to the first absorber 1010A and first gas conditioning system 1020A and the second absorber 1010B and second gas conditioning system 1020B, respectively, such that flow from each of the gas conditioning systems 1020A and 1020B can be accelerated.

A feed stream 1002 can be fed into the acid gas removal system 1060 where one or more acid gases can be removed from the feed stream 1002 to produce a clean stream a portion of which is fed into each of gas conditioning systems 1020A and 1020B. It is contemplated that equal volumes of the clean stream can be fed into each of the first and second gas conditioning systems 1020A and 1020B, although it is alternatively contemplated that the gas conditioning systems 1020A and 1020B could receive unequal portions of the clean stream per unit of time. It is contemplated that each of the first and second gas conditioning systems 1020A and 1020B could comprise a direct contact cooler or other commercially suitable device for condensing the clean stream.

From the first and second gas conditioning systems 1020A and 1020B, the conditioned streams can flow into respective first and second absorbers 1010A and 1010B. Preferably, each of the first and second absorbers 1010A and 1010B comprises a primary carbon capture system, although it is alternatively contemplated that one or both of the first and second absorbers 1010A and 1010B can comprise other commercially suitable absorbers. The product fluids of the first and second absorbers 1010A and 1010B can be combined into a single stream 1032 via ductwork 1022, although it is contemplated that the streams exiting absorbers 1010A and 1010B could remain separated.

FIG. 11 illustrates another embodiment of a flue gas cleaning system 1100 that lacks the booster fans of FIG. 10. With respect to the remaining numerals in FIG. 11, the same considerations for like components with like numerals of FIG. 10 apply.

Figure 12:
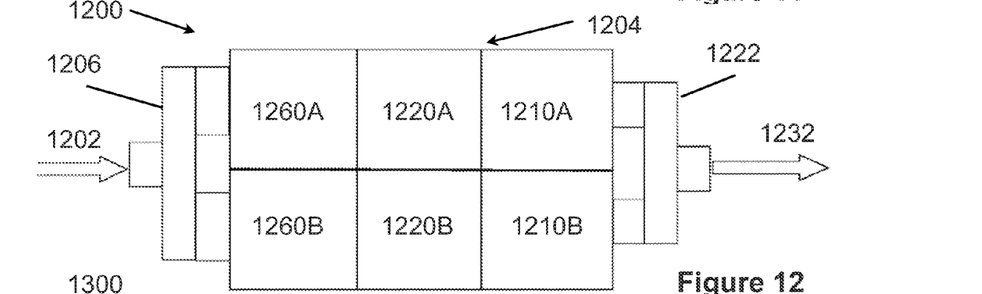

In FIG. 12, yet another embodiment of a flue gas cleaning system 1200 is shown having a housing 1204, which includes first and second acid gas removal systems 1260A and 1260B, along with first and second gas conditioning systems 1220A and 1220B and first and second absorbers 1210A and 1210B. A feed stream 1202 can flow to the acid gas removal systems 1260A and 1260B via ductwork 1206 where one or more acid gases can be removed before the respective streams can be conditioned in respective first and second gas conditioning systems 1220A and 1220B. With respect to the remaining numerals in FIG. 12, the same considerations for like components with like numerals of FIG. 10 apply.

Figure 13:
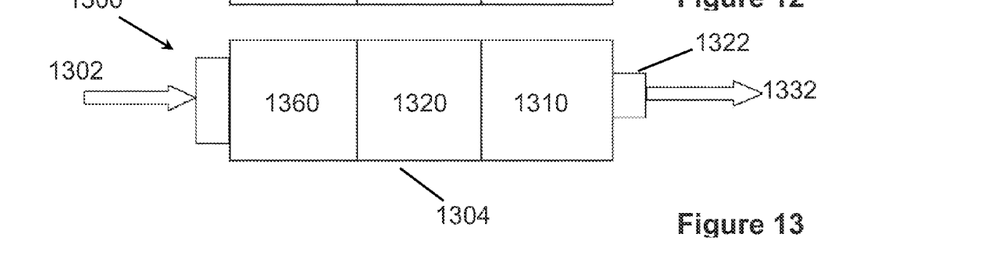

In FIG. 13, an alternative embodiment of a flue gas cleaning system 1300 is shown having a housing 1304 that combines an absorber 1310, gas conditioning system 1320, and acid gas removal system 1360 in a single vessel. With respect to the remaining numerals in FIG. 13, the same considerations for like components with like numerals of FIG. 10 apply.

Figure 14:
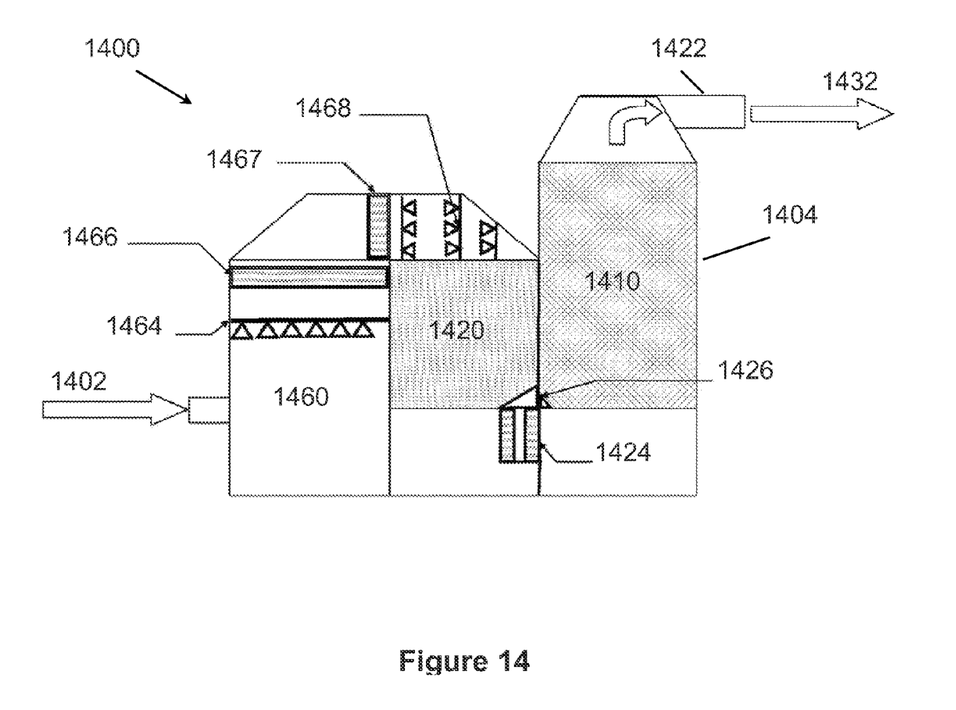

FIG. 14 illustrates another embodiment of a flue gas cleaning system 1400 having a housing 1404 that includes an absorber 1410, a gas conditioning system 1420, and an acid gas removal system 1460 combined in a single vessel. The acid gas removal system 1460 can include sprays 1464 that are configured to contact a feed stream 1402 with a soluble reagent to produce a clean stream. The clean stream can flow by mist eliminators 1466 and 1467 to remove excess liquid from the clean stream. Spray nozzles (not shown) can be included in the area mist eliminators 1466 and 1467 to further clean the stream. The clean stream can then flow to gas conditioning system 1420 and by sprays 1468 where the clean stream can be conditioned in a downflow direct contact cooler or other commercially suitable device. Mist eliminators 1424 can fluidly coupled downstream of the gas conditioning system 1420 and upstream of the absorber 1410.

The conditioned stream can then pass into absorber 1410 to produce a second clean stream 1432 that exits the absorber via ductwork 1422. It is contemplated that the gas conditioning system 1420 and/or the absorber 1410 can include various flow distribution devices or awnings 1426 that are known in the art to thereby change the flow distribution in the gas conditioning system 1420 and/or absorber 1410. With respect to the remaining numerals in FIG. 14, the same considerations for like components with like numerals of FIG. 6 apply.

Figure 15:
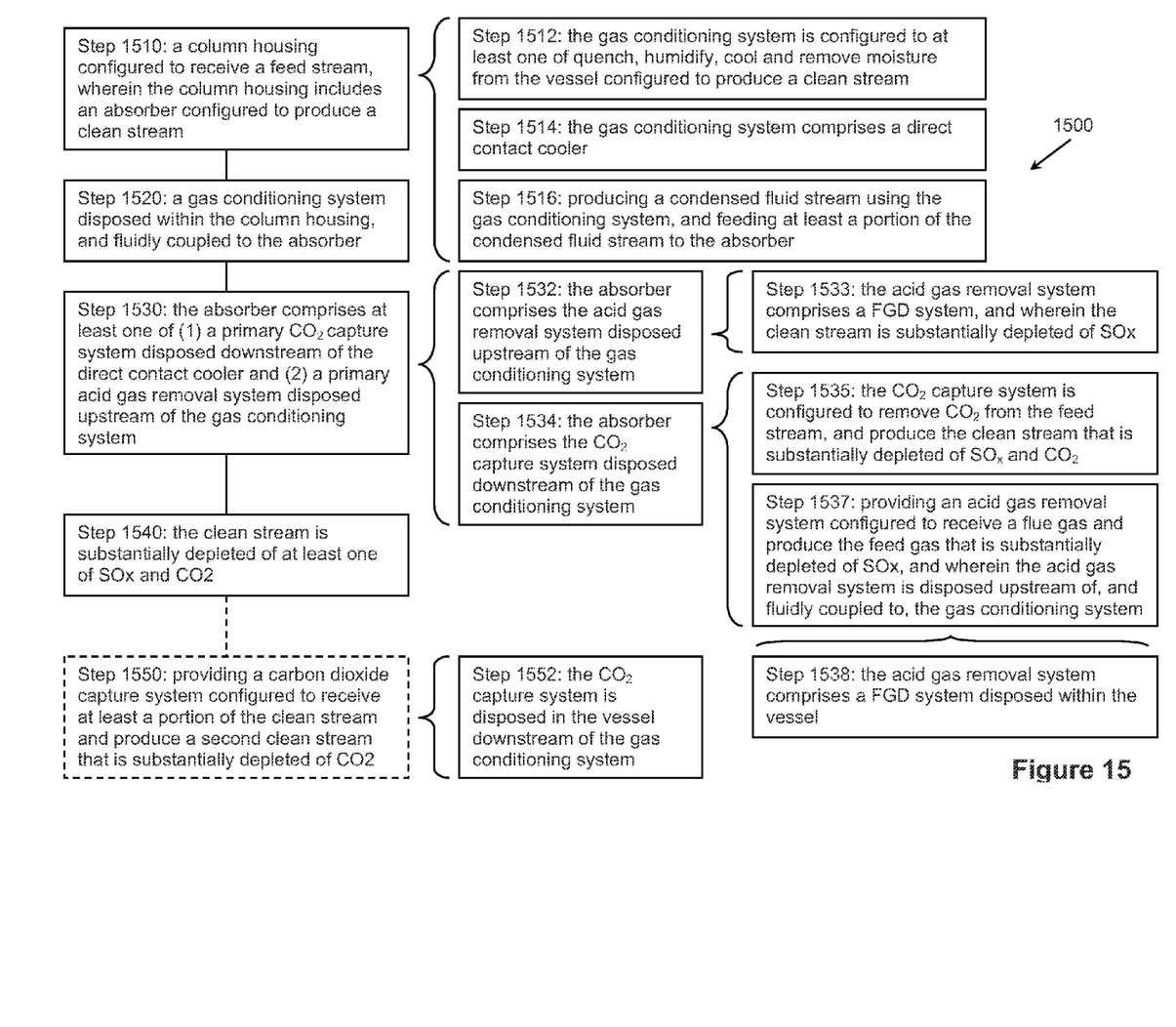
FIG. 15 is a flowchart of one embodiment of a method of conditioning a post-combustion flue gas.

In FIG. 15, one embodiment of a method 1500 of conditioning a post-combustion flue gas is depicted. In step 1510, a feed stream can be received in a vessel that houses an absorber and a gas conditioning system fluidly coupled to the absorber. In step 1512, the gas conditioning system can be configured to at least one of quench, humidify, cool and remove moisture or other condensable gases from the vessel. In step 1514, the gas conditioning system comprises a direct contact cooler. In step 1516, a conditioned fluid stream can be produced using the gas conditioning system, and at least a portion of the conditioned fluid stream can be fed to the absorber.

A clean stream can be produced in step 1520 that is substantially depleted of at least one of $SO_x$ and $CO_2$.

In step 1530, the absorber can comprise at least one of (1) a primary carbon dioxide capture system disposed downstream of the gas conditioning system and (2) a primary acid gas removal system disposed upstream of the gas conditioning system. In step 1532, the absorber comprises the acid gas removal system disposed upstream of the gas conditioning system, such that the acid gas removal system and gas conditioning system can be housed in a single vessel. In a preferred embodiment shown in step 1533, the acid gas removal system comprises a flue gas desulfurization system, which produces the clean stream that is substantially depleted of $SO_x$.

In step 1534, the absorber comprises the carbon dioxide capture system disposed downstream of the gas conditioning system. In step 1535, the carbon dioxide capture system can be configured to remove $CO_2$ from the feed stream, and produce the clean stream that is substantially depleted of $SO_x$ and $CO_2$. An acid gas removal system can be provided in step 1537 that is configured to receive a flue gas and produce the feed gas substantially depleted of $SO_x$, and that is disposed upstream of, and fluidly coupled to, the gas conditioning system. In preferred embodiments, the acid gas removal system comprises a flue gas desulfurization system disposed within the vessel (step 1538).

In step 1540, the clean stream is substantially depleted of at least one of $SO_x$ and $CO_2$.

In optional step 1550, a $CO_2$ capture system can be provided that is configured to receive at least a portion of the clean stream and produce a second clean stream substantially depleted of $CO_2$. The carbon dioxide capture system can be disposed in the vessel downstream of the gas conditioning system (step 1552).

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A flue gas cleaning system, comprising:
 a column housing configured to receive a feed stream, and that houses:
  a primary acid gas removal system configured to receive the feed stream and produce a first clean stream that is substantially depleted of $SO_x$, wherein the primary acid gas removal system includes one or more sprays configured to emit a soluble reagent to contact the feed stream;
  a gas conditioning system fluidly coupled to, and located downstream from, the primary acid gas removal system, wherein the gas conditioning system is configured to at least one of quench, humidify, cool, and remove moisture or other condensable gases from the first clean stream to produce a conditioned gas stream and a condensed stream;
  a primary carbon dioxide capture system fluidly coupled to, and located downstream from, the gas conditioning system, wherein the primary carbon dioxide capture system is configured to produce a second clean stream that is substantially depleted of $SO_x$ and $CO_2$; and
  a separation tray disposed between the primary carbon dioxide capture system and the gas conditioning system and configured to separate fluid in the primary carbon dioxide capture system from the gas conditioning system.

2. The system of claim 1, further comprising a second separation tray that is configured to separate fluid in the gas conditioning system from the primary acid gas removal system.

3. The system of claim 1, wherein the gas conditioning system comprises a direct contact cooler.

4. The system of claim 1, wherein the primary acid gas removal system comprises a flue gas desulfurization system.

5. The system of claim 1, wherein at least a portion of the condensed stream is stored in a tank via a conduit.

6. The system of claim 1, wherein the carbon dioxide capture system is configured to receive the conditioned stream to thereby produce the second clean stream that is substantially depleted of $SO_x$ and $CO_2$.

7. A flue gas cleaning system, comprising:
 a column housing configured to receive a feed stream, and that houses:
  a primary acid gas removal system configured to receive the feed stream and produce a first clean stream that is substantially depleted of $SO_x$, wherein the primary acid gas removal system includes one or more sprays configured to emit a soluble reagent to contact the feed stream;
  a gas conditioning system fluidly coupled to, and located downstream from, the primary acid gas removal system, wherein the gas conditioning system is configured to at least one of quench, humidify, cool, and remove moisture or other condensable gases from the first clean stream to produce a conditioned gas stream and a condensed stream;
  a primary carbon dioxide capture system fluidly coupled to, and located downstream from, the gas conditioning system, wherein the primary carbon dioxide capture system is configured to produce a second clean stream that is substantially depleted of $SO_x$ and $CO_2$;

a separation tray disposed between the primary carbon dioxide capture system and the gas conditioning system, wherein the separation tray is configured to collect a rich solvent produced by the primary carbon dioxide capture system.

8. The system of claim 7, further comprising a tank, wherein a portion of the rich solvent collected by the separation tray is fed into the tank via a conduit.

9. The system of claim 5, further comprising a pump coupled to the tank that is configured to purge condensed stream stored in the tank from the system.

10. The system of claim 1, further comprising an external conduit coupled to the primary carbon dioxide system that is configured to remove at least a portion of a rich solvent.

11. The system of claim 10, further comprising a tank coupled to the external conduit that is configured to store the portion of the rich solvent.

12. The system of claim 1, further comprising mist eliminators disposed in the primary acid gas removal system that are configured to remove excess liquid.

13. The system of claim 1, wherein the column housing is a single, vertical column, such that the primary carbon dioxide capture system is disposed above the gas conditioning system, and the gas conditioning system is disposed above the entire primary acid gas removal system.

14. The system of claim 7, wherein the column housing is a single, vertical column, such that the primary carbon dioxide capture system is disposed above the gas conditioning system, and the gas conditioning system is disposed above the entire primary acid gas removal system.

* * * * *

UNITED STATES PATENT AND TRADEMARK OFFICE
CERTIFICATE OF CORRECTION

PATENT NO. : 9,492,786 B2
APPLICATION NO. : 13/302297
DATED : November 15, 2016
INVENTOR(S) : Dennis W. Johnson and James H. Brown Page 1 of 1

It is certified that error appears in the above-identified patent and that said Letters Patent is hereby corrected as shown below:

On the Title Page

Assignee "Fluor Corporation, Sugar Land, TX (US)" should be "Fluor Technologies Corporation, Aliso Viejo, CA (US)"

Signed and Sealed this
Thirteenth Day of March, 2018

Andrei Iancu
*Director of the United States Patent and Trademark Office*